(12) United States Patent
Nakabayashi et al.

(10) Patent No.: US 9,041,512 B2
(45) Date of Patent: May 26, 2015

(54) ELECTRONIC KEY

(75) Inventors: Shigeru Nakabayashi, Kanagawa (JP); Koichi Sasaki, Kanagawa (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 14/007,733

(22) PCT Filed: Mar. 29, 2012

(86) PCT No.: PCT/JP2012/002195
§ 371 (c)(1),
(2), (4) Date: Sep. 26, 2013

(87) PCT Pub. No.: WO2012/132457
PCT Pub. Date: Oct. 4, 2012

(65) Prior Publication Data
US 2014/0043140 A1    Feb. 13, 2014

(30) Foreign Application Priority Data

Mar. 30, 2011   (JP) .................................. 2011-075031
Mar. 30, 2011   (JP) .................................. 2011-075032

(51) Int. Cl.
*B60R 25/00*   (2013.01)
*H04B 1/034*   (2006.01)
(Continued)

(52) U.S. Cl.
CPC ............ *G05B 11/01* (2013.01); *G07C 9/00944* (2013.01); *G05G 1/02* (2013.01); *H04B 1/03* (2013.01); *G08C 17/02* (2013.01)

(58) Field of Classification Search
USPC ....................................................... 340/5.72
See application file for complete search history.

(56) References Cited

U.S. PATENT DOCUMENTS 6,442,985 B1 *   9/2002   Watanuki et al. ................ 70/186
6,474,123 B1 *  11/2002   Kito et al. .................... 70/456 R
(Continued)

FOREIGN PATENT DOCUMENTS

CN   1621648 A   6/2005
CN   102124177 A   7/2011
(Continued)

OTHER PUBLICATIONS

International Search Report for PCT/JP2012/002195 dated May 15, 2012.
(Continued)

*Primary Examiner* — Jennifer Mehmood
*Assistant Examiner* — John Mortell
(74) *Attorney, Agent, or Firm* — Pearne & Gordon LLP

(57) ABSTRACT

Provided is an electronic key in which a waterproof rubber can be prevented from getting damaged at the time of assembling various parts into an upper case. This electronic key includes: upper case (10) and lower case (20) that fit together and seal the interior thereof; inner case (30) covered by upper case (10) and lower case (20) and having, on the lower-surface side thereof, battery (39) that drives an electronic circuit performing communication with the exterior; waterproof rubber (40) covering the upper-surface side of inner case (30); upper-case projection (18) that projects from the inner wall of upper case (10); and waterproof-rubber outer-wall recess (45) that is recessed in the outer wall surface of waterproof rubber (40) and receives upper-case projection (18). A space is provided between upper-case projection (18) and waterproof-rubber outer-wall recess (45).

4 Claims, 4 Drawing Sheets

(51) Int. Cl.
*H04B 1/38* (2006.01)
*G05B 11/01* (2006.01)
*G07C 9/00* (2006.01)
*G05G 1/02* (2006.01)
*G08C 17/02* (2006.01)
*H04B 1/03* (2006.01)

(56) References Cited

U.S. PATENT DOCUMENTS

| | | | |
|---|---|---|---|
| 6,705,141 B1 * | 3/2004 | Jacob et al. | 70/408 |
| 7,832,565 B2 * | 11/2010 | Sasaki | 206/703 |
| 8,528,374 B2 * | 9/2013 | Katagiri et al. | 70/456 R |
| 2004/0200709 A1 | 10/2004 | Sugimoto | |
| 2005/0143029 A1 | 6/2005 | Sasaki et al. | |
| 2010/0206704 A1 | 8/2010 | Shimura et al. | |

FOREIGN PATENT DOCUMENTS

| | | |
|---|---|---|
| CN | 102203365 A | 9/2011 |
| EP | 1 837 831 A2 | 9/2007 |
| EP | 2342404 A | 7/2011 |
| EP | 2 412 898 A1 | 2/2012 |
| JP | 2005-159221 A | 6/2005 |
| JP | 2008-22376 A | 9/2008 |
| JP | 2010-189971 A | 9/2010 |
| WO | 2010/052003 A1 | 5/2010 |
| WO | 2010/109806 A1 | 9/2010 |

OTHER PUBLICATIONS

Extended European Search Report issued in Application No. 12 76 3297 dated Feb. 5, 2014.
Written Opinion of the International Searching Authority for PCT/JP2012/002195 dated Oct. 10, 2013.

* cited by examiner

ELECTRONIC KEY

TECHNICAL FIELD

The present invention relates to an electronic key attached with a mechanical emergency key and used in a remote control system for opening and closing a door.

BACKGROUND ART

In recent years, a vehicle is equipped with a remote control system which performs wireless communication between an on-vehicle control unit and an electronic key held by a user so as to open and close doors of the vehicle in a non-contact manner. The electronic key which is carried outside the vehicle by the user is equipped with an inner casing in which an electronic circuit for performing wireless communication with the control unit is installed, and a battery for driving the electronic circuit. In order to prevent a failure of the electronic circuit inside the electronic key, a waterproof rubber is provided inside the casing of the electronic key for the waterproof and dustproof purposes. The waterproof rubber covers an upper surface side of the inner casing and is coupled to an upper casing. The battery is provided at the lower surface side of the inner casing (for example, see PTL 1).

CITATION LIST

Patent Literature

PTL 1
Japanese Patent Application Laid-Open No. 2010-189971

SUMMARY OF INVENTION

Technical Problem

When a lower casing is separated from the upper casing for a user to replace the battery of the electronic key, it is favorable for the inner casing to be held by the upper casing so that inner parts such as the waterproof rubber and the inner casing are not separated from the upper casing. In a case where the waterproof rubber is held by the upper casing, a projection which is projected from an inner wall of the upper casing toward the waterproof rubber is fitted to the waterproof rubber. When the inner casing is held by the waterproof rubber, a projection which is projected from an outer wall of the inner casing toward the waterproof rubber is fitted to the waterproof rubber. Accordingly, the inner casing is strongly held by the upper casing.

However, an increase in an external force applied to the upper casing sometimes causes separation of parts such as the inner casing and the waterproof rubber from the upper casing. When such separation occurs, the user assembles various parts to the upper casing again. However, assembling the inner casing to the waterproof rubber after the waterproof rubber is assembled to the upper casing involves a problem causing breakage of the waterproof rubber. This problem will be described below.

First, the waterproof rubber is pressed by the projection of the inner casing at the position of the projection of the upper casing when the inner casing is assembled to the waterproof rubber. At this time, the pressed waterproof rubber attempts to move toward the projection of the upper casing. However, the waterproof rubber at the position of the projection of the upper casing is nipped between the projection of the upper casing and the projection of the inner casing, and is compressed more than a compression limit. As a result, there occurs a problem causing breakage of the waterproof rubber.

Furthermore, an increase in an external force applied to the upper casing sometimes causes separation of parts such as the inner casing and the waterproof rubber from the upper casing. When such separation occurs, the user assembles various parts to the upper casing again. However, assembling the inner casing to the upper casing after the waterproof rubber is assembled to the inner casing involves a problem causing breakage of the waterproof rubber. This problem will be described below First, the waterproof rubber is pressed by the projection of the upper casing at the position of the projection of the inner casing when the inner casing is assembled to the upper casing. At this time, the pressed waterproof rubber attempts to move toward the projection of the inner casing. However, the waterproof rubber at the position of the projection of the inner casing is nipped between the projection of the upper casing and the projection of the inner casing, and is compressed more than the compression limit. As a result, there occurs a problem causing breakage of the waterproof rubber.

It is an object of the present invention to solve the above-described problems and to provide an electronic key capable of preventing breakage of a waterproof rubber during assembly of various parts to an upper casing.

Solution to Problem

An electronic key according to an aspect of the present invention includes: upper and lower casings that are fitted to each other so as to seal the inside of the casings; an inner casing that is covered by the upper and lower casings and that has a battery mounted on a lower surface side of the inner casing, the battery being used to drive an electronic circuit configured to communicate with the outside of the electronic key; a waterproof rubber that covers an upper surface side of the inner casing; an upper casing projection that projects from an inner wall surface of the upper casing; and a waterproof-rubber outer-wall recess portion that is recessed from an outer wall surface of the waterproof rubber and that houses the upper casing projection, in which a gap is formed between the upper casing projection and the waterproof-rubber outer-wall recess portion.

Furthermore, an electronic key according to an aspect of the present invention includes: upper and lower casings that are fitted to each other so as to seal the inside of the casings; an inner casing that is covered by the upper and lower casings and that has a battery mounted on a lower surface side of the inner casing, the battery being used to drive an electronic circuit configured to communicate with the outside of the electronic key; a waterproof rubber that covers an upper surface side of the inner casing; an inner casing projection that projects from an outer wall surface of the inner casing; and a waterproof-rubber inner-wall recess portion that is recessed from an inner wall surface of the waterproof rubber and that houses the inner casing projection, in which a gap is formed between the inner casing projection and the waterproof-rubber inner-wall recess portion.

Advantageous Effects of Invention

According to the present invention, it is possible to prevent breakage of a waterproof rubber during assembly of various parts to an upper casing.

DESCRIPTION OF EMBODIMENTS

Hereinafter, an electronic key according to an embodiment of the present invention will be described with reference to the drawings.

Figure 1:
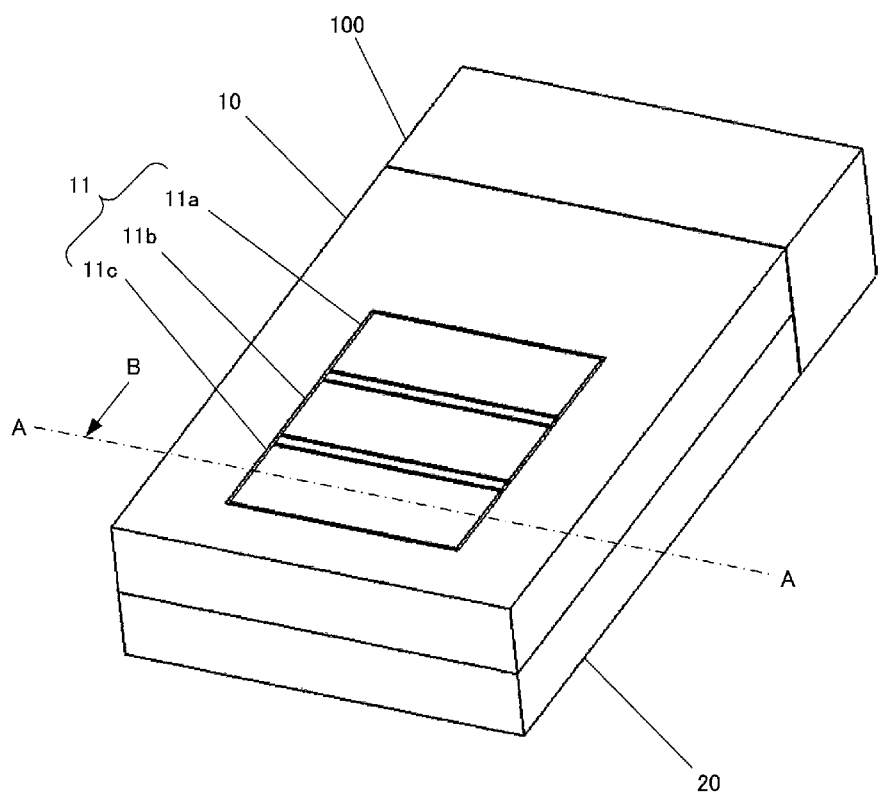
FIG. 1 is a perspective view illustrating an electronic key of an embodiment.
Figure 2:
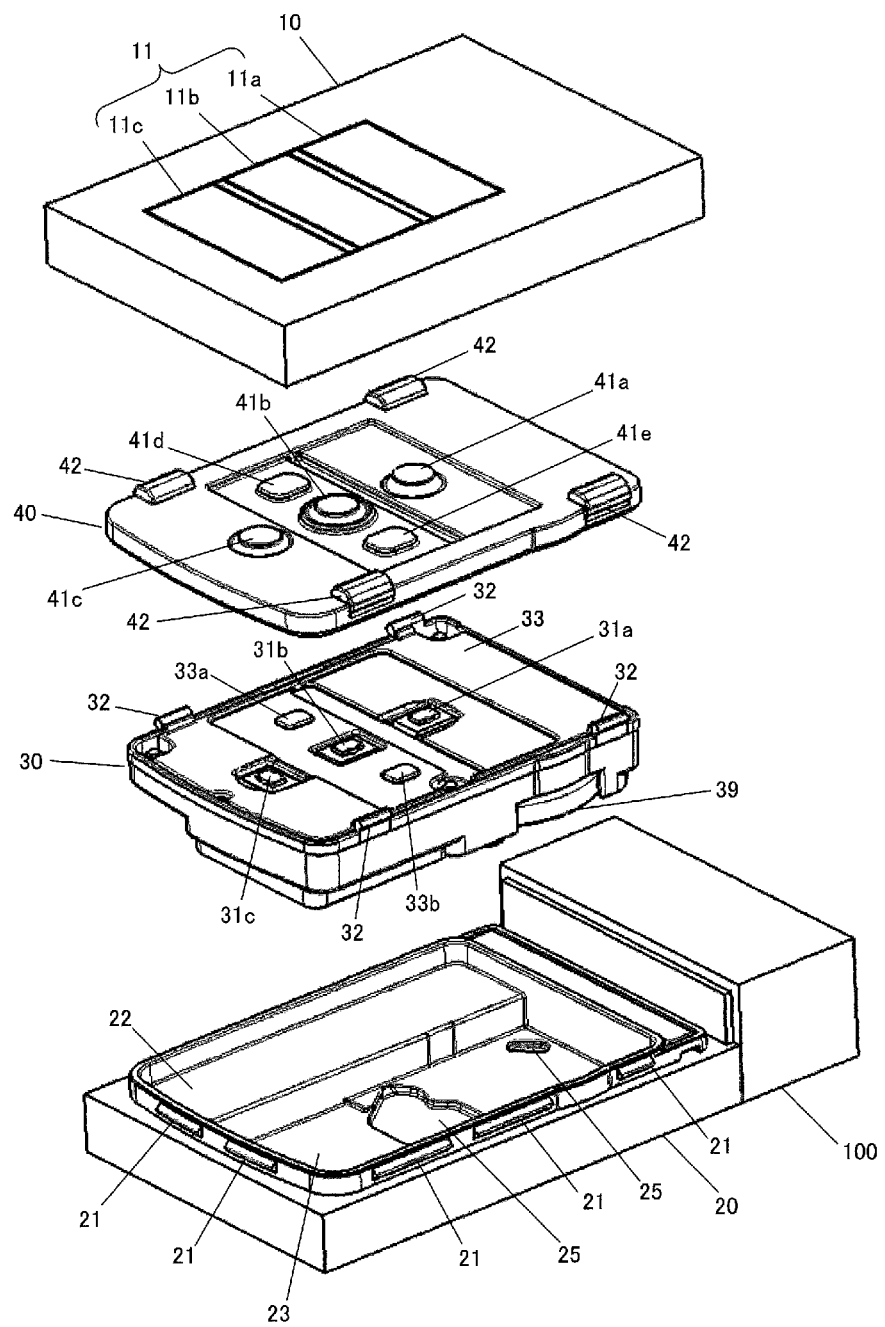
FIG. 2 is an exploded perspective view of FIG. 1.
Figure 3:
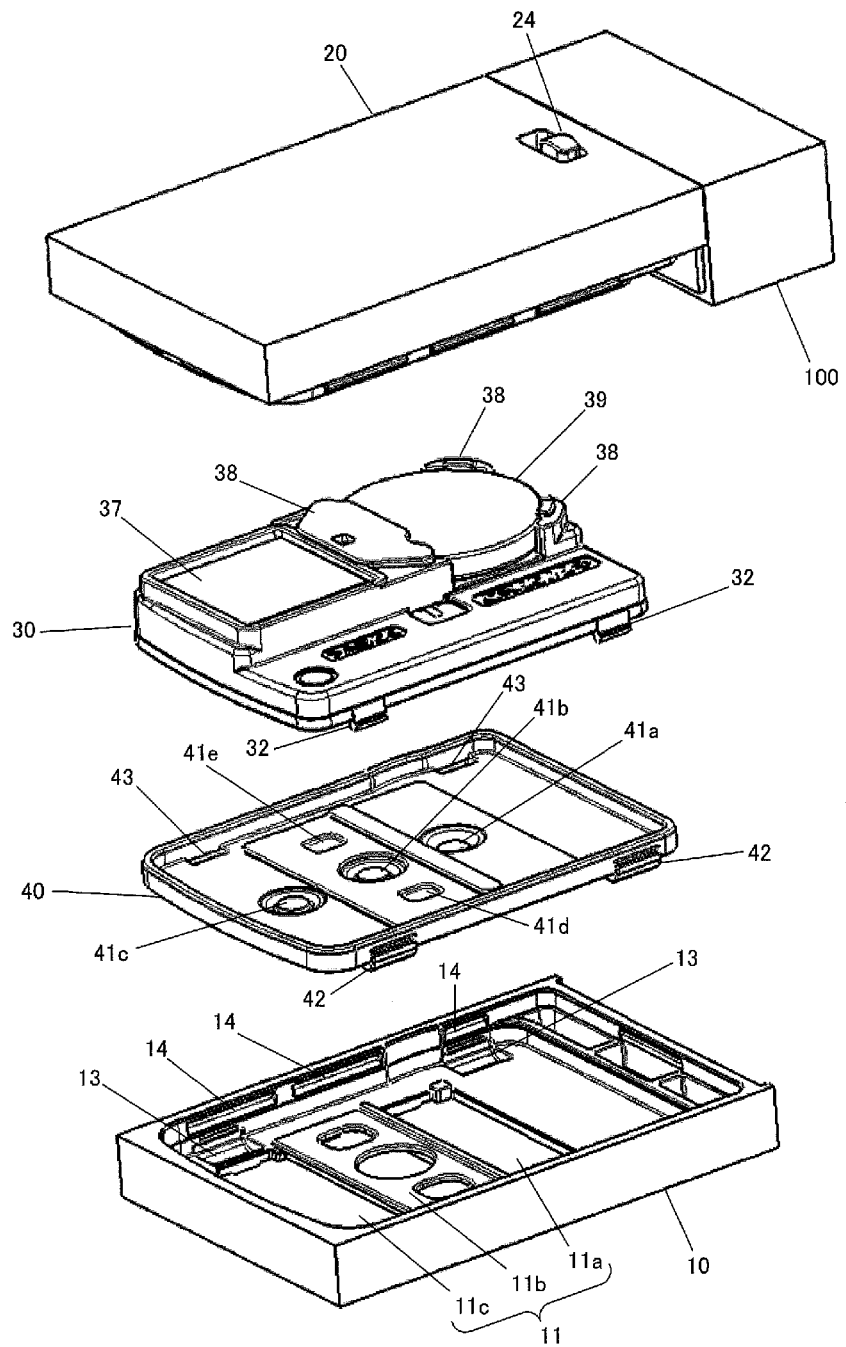
FIG. 3 is an exploded perspective view when the exploded perspective view of FIG. 2 is viewed upside down.
Figure 4:
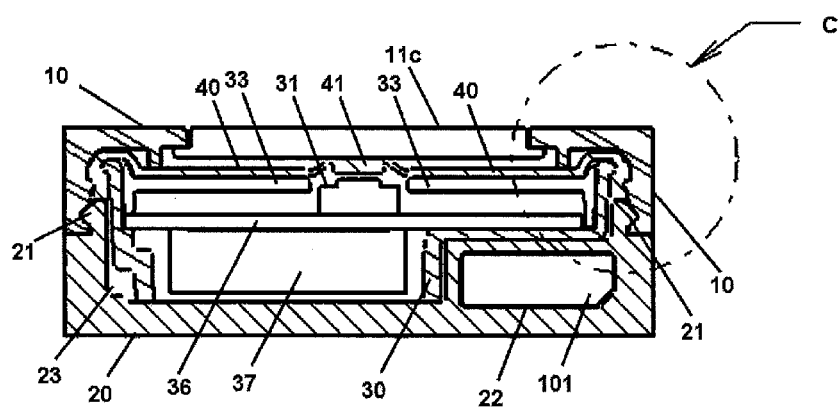
FIG. 4 is a cross-sectional view when the cross-section A-A of FIG. 1 is viewed in direction B.
Figure 5:
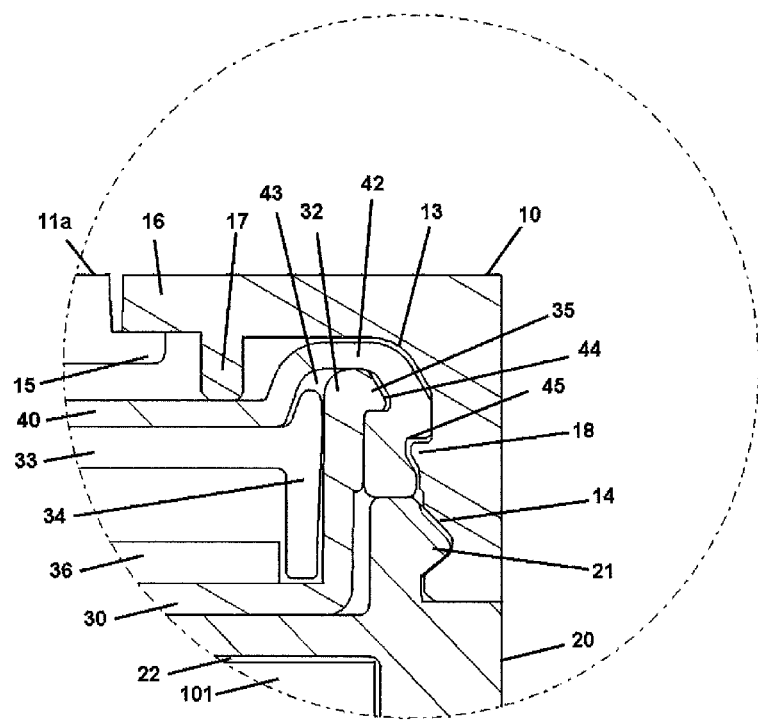
FIG. 5 is an enlarged view of region C of FIG. 4.

FIG. 1 is a perspective view illustrating an electronic key of the embodiment. FIG. 2 is an exploded perspective view of FIG. 1. FIG. 3 is an exploded perspective view when the exploded perspective view of FIG. 2 is viewed upside down. FIG. 4 is a cross-section when cross-section A-A of FIG. 1 is viewed from direction B. FIG. 5 is an enlarged view of region C of FIG. 4.

As illustrated in FIGS. 1 to 3, the electronic key includes upper casing 10, lower casing 20, inner casing 30 which is covered by upper casing 10 and lower casing 20, waterproof rubber 40 which covers the upper surface side of inner casing 30, and emergency key 100 which is accommodated to lower casing 20 for the emergency purpose.

Upper casing 10, lower casing 20 and inner casing 30 are made of resin. Upper casing 10 is coupled to lower casing 20 so as to house inner casing 30 and waterproof rubber 40 therein. Upper casing 10 is provided with button 11 including three buttons 11a to 11c.

The side wall of lower casing 20 is provided with locking claws 21. Locking claws 21 are respectively fitted to fitting portions 14 provided in the inner wall of upper casing 10. As illustrated in FIG. 4, lower casing 20 is provided with insertion portion 22 into which bar-like portion 101 of emergency key 100 is inserted. Furthermore, lower casing 20 is provided with recess portion 23 which is recessed from the upper surface of insertion portion 22. The bottom surface of lower casing 20 is provided with knob 24 which locks bar-like portion 101 of emergency key 100. When knob 24 is moved in a direction toward insertion portion 22, emergency key 100 is held by lower casing 20. Meanwhile, emergency key 100 is detachable from lower casing 20 by moving knob 24 in a direction away from insertion portion 22.

Circuit board 36 is disposed inside inner casing 30. The upper surface of circuit board 36 is provided with switches 31a to 31c. Further, inner casing projections 32 are projected from the upper portion of the outer wall surface of inner casing 30. Inner casing projections 32 are projected from each of both longitudinal end portions of the outer walls of inner casing 30.

Cover portion 33 is placed on the upper portion of inner casing 30. Cover portion 33 covers the upper surface of circuit board 36. The cover portion 33 includes three openings. Switches 31a to 31c are exposed through the openings. In cover portion 33, protruding portions 33a and 33b are respectively provided at the left and right sides of switch 31b.

The lower surface of inner casing 30 is provided with electronic circuit 37 which communicates with the outside, and battery 39 which drives electronic circuit 37. The lower surface of inner casing 30 is provided with holder 38. Battery 39 is held in inner casing 30 by holder 38. Holder 38 is placed on positioning recess portion 25 which is formed in a bottom surface of recess portion 23 of lower casing 20.

Waterproof rubber 40 is made of an elastic material and seals the upper surface of inner casing 30. The elastic material is made of, for example, rubber. Waterproof rubber 40 includes pressing portions 41a to 41c which protrude toward the upper surface side. When buttons 11a to 11c are pressed, pressing portions 41a to 41c provided in waterproof rubber 40 and switches 31a to 31c disposed in inner casing 30 are respectively pressed. In addition, waterproof rubber 40 further includes protection portions 41d and 41e which are respectively provided at the left and right sides of pressing portion 41b. Protection portions 41d and 41e are respectively disposed on the protruding portions 33a and 33b of cover portion 33. Waterproof rubber projection 42 is projected from the upper portion of the outer wall surface of waterproof rubber 40. Waterproof rubber projections 42 are projected from each of both longitudinal end portions of the outer wall surfaces of waterproof rubber 40. Waterproof rubber projections 42 are respectively fitted to upper casing recess portions 13 formed in the bottom surface inside upper casing 10. In the inner wall surface of waterproof rubber 40, the inner wall surfaces of waterproof rubber projections 42 are provided respectively with waterproof-rubber inner-wall recess portions 43 which are recessed from the inner wall surfaces of waterproof rubber 40. Inner casing projections 32 are housed in the waterproof-rubber inner-wall recess portions 43, respectively.

Next, a description will be given regarding a state where the respective components of the electronic key are assembled. As illustrated in FIGS. 4 and 5, each fitting portion 14 of upper casing 10 is fitted to locking claw 21 of lower casing 20. The front end of waterproof rubber 40 is pressed against the upper end of locking claw 21. Accordingly, a space between lower casing 20 and waterproof rubber 40 is sealed.

Button 11c includes flange portions 15 each extending in a flange shape from the bottom surface thereof. The upper surface of flange portion 15 is in contact with the lower surface of opening end 16 of upper casing 10. Upper casing 10 includes fixing portions 17 each projecting from the lower surface of opening end 16 and configured to fix waterproof rubber 40. Fixing portions 17 and cover portions 33 are in contact with waterproof rubber 40 while interposing waterproof rubber 40 in between. Ends 34 of cover portions 33 extend respectively from cover portions 33 in the up and down direction. The side wall of each of ends 34 is in contact with the inner wall surface of inner casing 30.

Waterproof rubber projections 42 of waterproof rubber 40 are each formed in a shape which is swollen upward with respect to the flat portion of waterproof rubber 40. Waterproof rubber projections 42 are fitted respectively to upper casing recess portions 13 of upper casing 10. A gap is partially formed between each of waterproof rubber projections 42 and a corresponding one of upper casing recess portions 13. The lower end of upper casing recess portion 13 is in contact with waterproof rubber projection 42.

Because of the swollen portion of waterproof rubber projection 42, the inner wall surface of waterproof rubber projection 42 is provided with waterproof-rubber inner-wall recess portion 43 which is recessed with respect to the flat portion of waterproof rubber 40. Inner casing projection 32 is fitted to waterproof-rubber inner-wall recess portion 43. The upper end of end 34 of cover portion 33 is also fitted to waterproof-rubber inner-wall recess portion 43.

Each inner casing projection 32 further includes claw portion 35. Claw portion 35 extends outward in a flange shape from inner casing projection 32. In addition, waterproof-rubber inner-wall recess portion 43 of waterproof rubber 40 includes locking recess portion 44 which is further recessed outward. Claw portion 35 is locked to locking recess portion 44. The lower surface of claw portion 35 is in contact with the upper surface of locking recess portion 44. Accordingly, inner casing 30 is held by waterproof rubber 40. Further, the outer wall surfaces of inner casing 30 positioned at the lower side of inner casing projections 32 are also in contact with the inner wall surfaces of waterproof rubber projections 42 of waterproof rubber 40.

Inner wall surfaces of upper casing 10 are each provided with upper casing projection 18. The boundary of upper casing recess portion 13 is defined by upper casing projection 18. The front end of each waterproof rubber projection 42 of waterproof rubber 40 is provided with waterproof-rubber outer-wall recess portion 45 which is recessed from the outer wall surface of waterproof rubber 40. Upper casing projection 18 is housed in waterproof-rubber outer-wall recess portion 45. The upper surface of upper casing projection 18 and the lower surface of waterproof-rubber outer-wall recess portion 45 are formed so as to be in contact with each other. Accordingly, waterproof rubber 40 is held by upper casing 10.

Each upper casing projection 18 is formed at a lower position than inner casing projection 32. In other words, inner casing projection 32 is formed at an upper position than upper casing projection 18. With this configuration, inner casing 30 can be held by upper casing 10 through waterproof rubber 40. That is, claw portion 35 is locked to locking recess portion 44 in waterproof-rubber inner-wall recess portion 43, so that inner casing 30 is held by waterproof rubber 40. When inner casing projection 32 is positioned at an upper position than upper casing projection 18, waterproof rubber 40 is held by upper casing 10 along with inner casing 30 by locking waterproof-rubber outer-wall recess portion 45 to upper casing projection 18.

A gap is formed between each proof rubber outer-wall recess portion 45 and corresponding upper casing projection 18. Accordingly, it is possible to prevent breakage of waterproof rubber 40 during assembling of inner casing 30 to upper casing 10 assembled with waterproof rubber 40.

Hereinafter, why breakage can be prevented will be described. During assembly of inner casing 30 to upper casing 10 assembled with waterproof rubber 40, waterproof rubber 40 is compressed the most when upper casing projections 18 face inner casing projections 32 with claw portions 35. At this time, the lateral distance between inner casing projection 32 and upper casing projection 18 is expressed by the distance between the front end of claw portion 35 and the front end of upper casing projection 18. Since a gap is formed between upper casing projection 18 and waterproof-rubber outer-wall recess portion 45, waterproof rubber 40 which is pressed by claw portion 35 of inner casing projection 32 can escape to the gap between upper casing projection 18 and waterproof-rubber outer-wall recess portion 45. Accordingly, it is possible to prevent breakage of the portion of waterproof-rubber outer-wall recess portion 45 of waterproof rubber 40 when the portion thereof is compressed more than the compression limit.

Further, at least a gap is partially formed between each waterproof-rubber inner-wall recess portion 43 and corresponding inner casing projection 32. In other words, a gap is formed between claw portion 35 and locking recess portion 44. Accordingly, it is possible to prevent breakage of waterproof rubber 40 during assembly of inner casing 30 assembled with waterproof rubber 40 to upper casing 10.

Hereinafter, why breakage can be prevented will be described. During assembly of inner casing 30 assembled with waterproof rubber 40 to upper casing 10, waterproof rubber 40 is compressed the most when upper casing projections 18 face inner casing projections 32 with claw portions 35. At this time, the lateral distance between the inner casing projection 32 and the upper casing projection 18 is expressed by the distance between the front end of claw portion 35 and the front end of upper casing projection 18. Since a gap is formed between claw portion 35 and locking recess portion 44, waterproof rubber 40 which is pressed by upper casing projection 18 can escape to the gap between claw portion 35 and locking recess portion 44. Accordingly, it is possible to prevent breakage of the portion of locking recess portion 44 of waterproof rubber 40 when the portion is compressed more than the compression limit.

As described above, according to the electronic key of the embodiment, since a gap is formed between each upper casing projection 18 and corresponding waterproof-rubber outer-wall recess portion 45, waterproof-rubber outer-wall recess portion 45 can escape to the gap between upper casing projection 18 and waterproof-rubber outer-wall recess portion 45 even when the waterproof-rubber outer-wall recess portion is pressed by claw portion 35 of inner casing projection 32. Accordingly, it is possible to suppress an increase in compression rate of the portion of waterproof-rubber outer-wall recess portion 45 in waterproof rubber 40 so that the compression rate is not greater than the compression limit. Accordingly, it is possible to prevent breakage of waterproof rubber 40 even when inner casing 30 is assembled to upper casing 10 assembled with waterproof rubber 40.

Further, according to the electronic key of the embodiment, since a gap is formed between each inner casing projection 32 and corresponding waterproof-rubber inner-wall recess portion 43, waterproof-rubber inner-wall recess portion 43 can escape to the gap between inner casing projection 32 and waterproof-rubber inner-wall recess portion 43 even when waterproof-rubber inner-wall portion is pressed by upper casing projection 18. Accordingly, it is possible to suppress an increase in compression rate of the portion of waterproof-rubber inner-wall recess portion 43 in waterproof rubber 40 so that the compression rate is not greater than the compression limit. Accordingly, it is possible to prevent breakage of waterproof rubber 40 even during assembly of inner casing 30 assembled with waterproof rubber 40 to upper casing 10.

Further, the inner wall surface of upper casing 10 and the outer wall surface of waterproof rubber 40 are in contact with each other at the upper position than upper casing projection 18, while the outer wall surface of inner casing 30 and the inner wall surface of waterproof rubber 40 are in contact with each other at the lower position than inner casing projection 32. Accordingly, it is possible to prevent breakage of waterproof rubber 40 and maintain a holding force of upper casing 10, inner casing 30, and waterproof rubber 40.

The disclosures of the specifications, drawings and abstracts of Japanese Patent Application Nos. 2011-75031 and 2011-75032 filed on Mar. 30, 2011, are incorporated herein by reference in their entirety.

INDUSTRIAL APPLICABILITY

The electronic key according to the present invention is useful for a remote control system which communicates with the outside. Particularly, the electronic key is useful for a keyless entry system involving replacement of a battery.

REFERENCE SIGNS LIST

10 Upper casing
18 Upper casing projection
20 Lower casing
30 Inner casing
32 Inner casing projection
39 Battery
43 Waterproof-rubber inner-wall recess portion
45 Waterproof-rubber outer-wall recess portion

The invention claimed is:

1. An electronic key comprising:
upper and lower casings that are fitted to each other so as to seal the inside of the casings;
an inner casing that is covered by the upper and lower casings, that does not comprise a bendable structure, and that has a battery mounted on a lower surface side of the inner casing, the battery being used to drive an electronic circuit configured to communicate with the outside of the electronic key;
a waterproof rubber that covers an upper surface side of the inner casing;
an upper casing projection that projects from an inner wall surface of the upper casing; and
a waterproof-rubber outer-wall recess portion that is recessed from an outer wall surface of the waterproof rubber and that houses the upper casing projection, wherein
a projection length of the upper casing projection from the inner wall surface of the upper casing is less than a recess length of the waterproof-rubber outer-wall recess portion from the outer wall surface of the waterproof rubber;
the inner wall surface of the upper casing is in contact with the outer wall surface of the waterproof rubber; and
a gap is formed between a first portion of the upper casing projection which is most projecting in a lateral direction and a second portion of the waterproof-rubber outer-wall recess portion which is faced to the first portion in the lateral direction, wherein the lateral direction is defined as a horizontal direction from an inner wall surface of the upper casing toward an inside of the upper casing when the upper casing and the lower casing are respectively arranged on an upper side and a lower side in a vertical direction.

2. The electronic key according to claim 1, further comprising:
an inner casing projection that projects from an outer wall surface of the inner casing; and
a waterproof-rubber inner-wall recess portion that is recessed from an inner wall surface of the waterproof rubber and that houses the inner casing projection, wherein:
the inner casing projection is positioned at an upper position than the upper casing projection;
the inner wall surface of the upper casing and the outer wall surface of the waterproof rubber are in contact with each other at an upper position than the upper casing projection; and
the outer wall surface of the inner casing and the inner wall surface of the waterproof rubber are in contact with each other at a lower position than the inner casing projection.

3. An electronic key comprising:
upper and lower casings that are fitted to each other so as to seal the inside of the casings;
an inner casing that is covered by the upper and lower casings, that does not comprise a bendable structure, and that has a battery mounted on a lower surface side of the inner casing, the battery being used to drive an electronic circuit configured to communicate with the outside of the electronic key;
a waterproof rubber that covers an upper surface side of the inner casing;
an inner casing projection that projects from an outer wall surface of the inner casing; and
a waterproof-rubber inner-wall recess portion that is recessed from an inner wall surface of the waterproof rubber and that houses the inner casing projection, wherein
a projection length of the inner casing projection from the outer wall surface of the inner casing is less than a recess length of the waterproof-rubber inner-wall recess portion from the inner wall surface of the waterproof rubber;
the outer wall surface of the inner casing is in contact with the inner wall surface of the waterproof rubber; and
a gap is formed between a third portion of the inner casing projection which is most projecting in a lateral direction and a fourth portion of the waterproof-rubber inner-wall recess portion which is faced to the third portion in the lateral direction, wherein the lateral direction is defined as a horizontal direction from an outer wall surface of the inner casing toward an outside of the inner casing when the upper casing and the lower casing are respectively arranged on an upper side and a lower side in a vertical direction.

4. The electronic key according to claim 3, further comprising:
an upper casing projection that projects from an inner wall surface of the upper casing; and
a waterproof-rubber outer-wall recess portion that is recessed from an outer wall surface of the waterproof rubber and that houses the upper casing projection, wherein:
the inner casing projection is positioned at an upper position than the upper casing projection;
the outer wall surface of the inner casing and the inner wall surface of the waterproof rubber are in contact with each other at a lower position than the inner casing projection; and
the inner wall surface of the upper casing and the outer wall surface of the waterproof rubber are in contact with each other at an upper position than the upper casing projection.

* * * * *